April 4, 1939.　　　　R. ERBAN　　　　2,152,797
TRANSMISSION
Filed Jan. 15, 1936
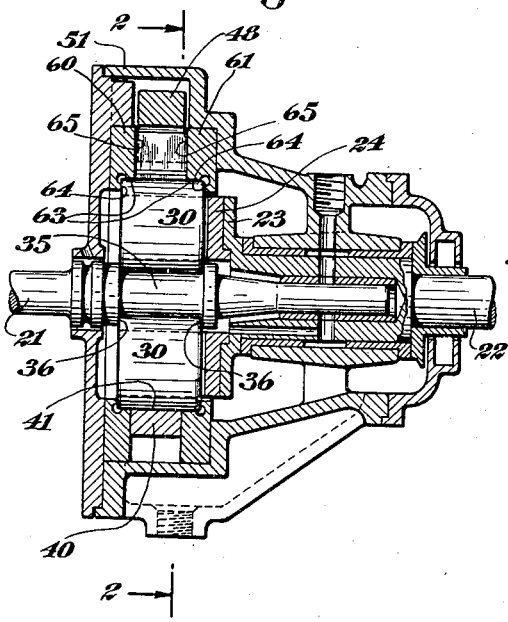
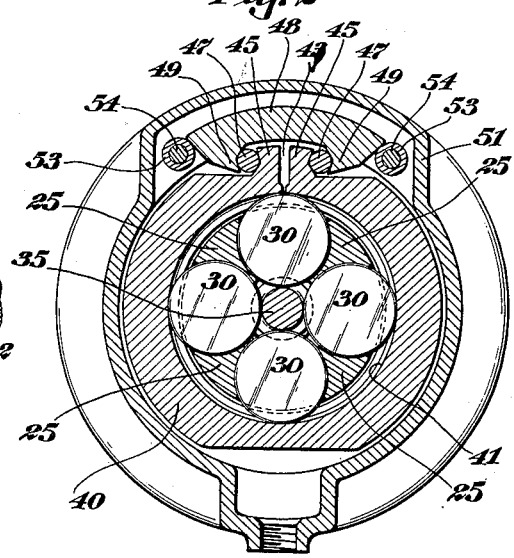
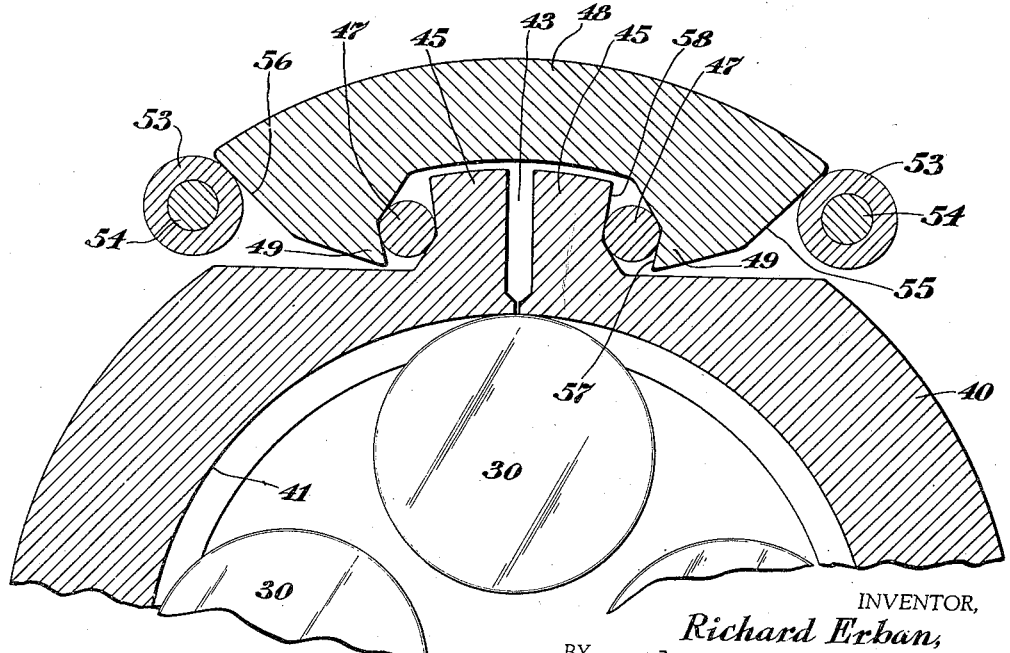
INVENTOR,
Richard Erban,
BY
ATTORNEY Patented Apr. 4, 1939

2,152,797

UNITED STATES PATENT OFFICE 2,152,797

TRANSMISSION

Richard Erban, New York, N. Y., assignor to Erban Patents Corporation, New York, N. Y., a corporation of New York Application January 15, 1936, Serial No. 59,172

10 Claims. (Cl. 74—302)

My present invention relates generally to an adhesive transmission. One feature thereof relates to a new and improved bearing arrangement for the transmission. Another feature thereof relates to a new and improved arrangement for automatically applying the torque to give the required contact pressure.

One of the objects of my invention is the provision of a transmission of the adhesive type wherein the bearings are provided for the transmission in a simple, effective and economical manner.

Another object of my invention is the provision of a novel arrangement whereby the proper binding pressure is automatically applied between the races and rollers of an adhesive system.

For the attainment of these objects and such other objects as may hereinafter appear to be pointed out I have illustrated an embodiment of my invention wherein;

Figure 1 is a longitudinal section through the transmission;

Figure 2 is a transverse section taken on line 2—2 of Figure 1; and

Figure 3 is an enlarged view of a detail.

Upon viewing Figures 1 and 2 of the drawing, it will be observed that I have here illustrated two shafts 21 and 22 either of which may be the input and the other the output shaft. For purposes of convenience of description I will assume that 22 is the input shaft and that 21 is the output shaft. The shaft 22 is provided with the flange 23 to which is affixed the roller carrier or cage comprising the disk 24 and the separator members 25. The rollers 30 illustrated as cylindrical in form and as four in number are mounted each to be freely received between two adjacent separating members 25 for free rotation relatively thereto.

The shaft 21 is shown as provided with the section 35 which is illustrated as relatively small in diameter and shaped so as to form an inner raceway for the rollers 30 and as provided with the flanges 36 between which the rollers are received and by which the rollers are guided in their rotation.

The outer race member 40 is in the form of a ring having its inner surface conformed to serve as the outer race-way 41 or the transmission system. This ring is split at 43 as clearly shown in Figures 2 and 3, so as to permit the ring to be contracted and expanded to thereby deform its inner surface 41 and in this manner to modify the adhesive contact between the outer raceway 41 and the rolling bodies so as to regulate the adhesive pressure between the rollers and races.

The ring 40 is provided at the sides of and adjacent to the split 43 with upstanding tongues or projections 45 so shaped that their lateral outer surfaces each provide a seat 58 for the balls or cylindrical rollers 47. A member 48 generally of the shape shown in Figure 2 of the drawing, is provided with the downwardly extending projections 49. The projections 49 have their inner faces predeterminedly shaped so as to provide seats 57, to complement the corresponding and opposed seats of the projections 45 to complete what, in effect are two torque loading devices, each comprising a roller 47 received between the two opposed seats 57 and 58. The seats 57 and 58 forming each set are slightly out of parallel to the extent and for the purpose that will be understood when the manner of operation of the torque loading device is explained.

The member 48 is carried by the ring 49 which, in itself, is free to rotate, but is held from rotation except to the extent of and in the manner now to be pointed out. The transmission casing 51 is provided with two transverse members which may be of any preferred or desired shape and which are illustrated in the drawing as small rollers 53 each mounted to rotate freely about the pins 54.

Upon viewing Figure 3 of the drawing it will be observed that the member 48 is provided at the opposite extreme ends with the inclined surfaces 55 and 56 and that the parts are all dimensioned and positioned so that the inclined surfaces 55 and 56 are received between the rollers 53 in the manner and relation shown in Figure 3.

From the description thus far given it will be observed that the transmission comprises the input shaft 22, the output shaft 21, the inner race 35, the outer race 40, the rolling bodies 30 and two torque loading devices.

As I will now point out in the operation of the device either one or the other of the torque loading devices will be operated automatically by the member 48 in its cooperation with either of the rollers 53 depending upon the direction of rotation; so that it could be said of this arrangement that the torque loading device in front, with reference to the direction of rotation, is the one that functions and the other functions only upon the change of direction of rotation.

Assuming that the input shaft 22 and with it the members 25 in Figure 2, are rotated clockwise, the rollers 30 which are carried by and with the members 25 will tend to cause the member 40 to rotate clockwise. This in turn will tend to carry the member 48 also in a clockwise direction to cause the inclined surface 55, at the right, to be forced against the roller 53 at the right, and the tendency of this action will be to swing the right end of the member 48 upwardly about the roller 47 at the left as a pivot. In this movement the surface 57 at the right will be moved upwardly to cause the application of pressure to the member 45 at the right through the roller 47 at the right; and this application of pressure will cause the ring 40 to be so constricted that the outer race surface 41 will adhesively engage the rollers and apply between the element of the transmission system the pressure which is required. It has already been stated before that the surfaces 57 and 58 are shown as out of parallel and the degree of this is predeterminedly such that when the one end of the member 48 is swung upwardly these two surfaces will reach a position of parallelism at which point the functioning of the torque loading device as such will be effected.

Assuming that the input shaft 22 is driven in a reverse direction, i. e. counterclockwise, it will be the torque loading device at the left which will function to apply the pressure to make the system operative.

I will now describe my improved bearing arrangement for the transmission.

Upon viewing Figure 1 of the drawing it will be observed that the split ring 40 is narrower than the rollers 30 and is positioned so as to have the rollers project to both sides thereof. By this arrangement I am able to provide bearings for the transmission in the manner that I will now point out.

Mounted within the casing and to opposite sides of the ring 40 are the bearing rings 60, 61 each provided with the bearing surfaces 63, 64 and 65. The surfaces 63 of the two bearings provide radial bearing for the rollers 30 and therefore for the adhesive system. The surfaces 64 serve as axial bearings for the rollers 30 and therefore for the adhesive system. In addition the inner opposed surfaces 65 of the two members serve as axial bearings for the ring 40. By provision of the surfaces 63, 64 and 65 supported from the casing in any preferred or desired manner, as for example in the manner shown in the drawing, I provide for all the bearings that a system of this character requires.

Upon viewing Figure 1 of the drawing, it will be observed that the entire transmission is free of contact with the casing, and therefore might be termed as floating within the casing, except through the aforementioned bearings, the main one of which is established by the contact of the inner surfaces of the ring 60 directly with the rollers which serve primarily as transmission elements.

Having thus described my invention and illustrated its use, what I claim as new and desire to secure by Letters Patent is:

1. In a friction transmission system: coaxial races, one of which is in the form of a deflectable ring; rolling bodies interposed between the races and frictionally engaging the surface of each of the races, said deflectable ring being floatingly supported by said rolling bodies, the axes of the rolling bodies being substantially parallel to the axis of the races, said rolling bodies projecting axially beyond said deflectable ring; and a bearing member mounted adjacent to said deflectable ring and having an annular bearing surface with which the projecting rolling bodies make rolling engagement to be supported against forces directed radially of the races.

2. In a friction transmission system in which torque is transmitted through frictional driving contact: an inner race; a floating outer race surrounding the inner race and coaxial therewith; rolling bodies interposed between the races, means for elastically deforming said floating race to increase the pressure of frictional engagement with said rollers, the axes of the rolling bodies being substantially in parallelism, said rolling bodies projecting axially beyond said floating race; and means for radially supporting said rolling bodies and axially confining said floating race, said means comprising a bearing ring positioned adjacent to each side of the floating race, each of said bearing rings having an annular bearing surface with which the projecting rolling bodies make rolling engagement.

3. A friction transmission comprising: a casing; inner and outer races coaxially positioned within the case, one race surrounding the other; rolling bodies interposed between the races and frictionally engaging the surface of each of the races, one of the races being rigid and the other being deflectable to vary the friction between the rolling bodies and the races, said deflectable race being free of any support by the casing so as to float upon said rolling bodies, and the rolling bodies projecting axially on each side of the deflectable race; and two bearing rings independent of the races and with respect to which each of the races is movable, the bearing rings being supported directly by said casing and being axially separated by the deflectable race, each bearing ring having an annular bearing surface engaged by said rolling bodies, and the path of movement of the rolling bodies being determined solely by said bearing rings and said rigid race.

4. A friction transmission system comprising: an inner race; a deflectable outer race surrounding the inner race; rolling bodies interposed between the races and frictionally engaging the surface of each of the races, said rolling bodies having cylindrical surfaces projecting axially beyond said outer race; said rolling bodies forming the only support for said outer race against radial displacement, a bearing ring adjacent to the outer race, the bearing ring having a cylindrical bearing surface constituting a running path with which the cylindrical surfaces of the rolling bodies contact; and means for supporting said bearing ring.

5. In a friction transmission of the type in which a driving shaft is operatively connected with a driven shaft by torque transmitting means: an inner race on one of the shafts; cylindrical rollers in frictional contact with said inner race; a driving connection between said rollers and the other shaft; an outer race embracing and frictionally contacting the rollers, one of the races being distortable to establish adhesive pressure between the rollers and the inner race, and the rollers projecting axially beyond the contact surface of the distortable race; a casing inclosing the races and rollers; said distortable race being free of effective support from the casing and supported only by said rollers, a nondistortable bearing member immediately adjacent each side of the distortable race and means to support said bearing members with respect to the casing, each bearing member having a circular bearing surface with which all of the rollers make rolling contact, each of the circular bearing surfaces lying in axial extension of the race surface of the distortable race, and each of the bearing members having an annular flange cooperating with the ends of the rollers to provide an axial abutment therefor.

6. A friction transmission comprising: an inner race; an outer race surrounding the inner race; means to impose a torque on each of said races; rolling bodies interposed between said races and in frictional contact therewith; one of said races being elastically deformable to cause a radial pressure between the races and the rolling bodies; a casing inclosing the races and rolling bodies; and means for radially supporting the rolling bodies and serving in effect as a radial bearing between the foregoing assembly of transmission elements and the casing, said means comprising a member having an annular track embracing the rolling bodies and with which the rolling bodies make running engagement; the said elastically deformable race being effectively free of the casing and floatingly supported by the rolling bodies.

7. A friction transmission comprising: inner and outer concentric races; rolling bodies interposed between the races and in frictional contact with each of the races, one of said races being split and being resiliently deformable to cause a radial pressure between the races and the rolling bodies, the rolling bodies having cylindrical surfaces projecting axially beyond said deformable race; and means forming in effect a bearing for the foregoing assembly of transmission elements, said means being positioned adjacent to said deformable race and having a substantially non-distortable cylindrical surface with which the cylindrical surfaces of the rolling bodies make running contact.

8. A friction transmission comprising: coaxial races, one surrounding the other; rolling bodies interposed between the races and in frictional contact with each of the races, one of the races being distortable and having a cam surface arranged to receive distorting pressure in substantially tangential direction; and means to distort said distortable race, said means comprising a member carried by the distortable race but movable relative thereto, the member having a cam surface facing said cam surface on the race and positioned at substantially right angles to the direction of said distorting pressure, and a rolling body interposed between them to apply distorting force in substantially tangential direction to the race in response to relative movement of said member.

9. A friction transmission comprising: coaxial races, one surrounding the other; rolling bodies interposed between the races and in frictional contact with each of the races, one of the races being split and being resiliently distortable to increase the pressure of the rolling bodies on the races, the split race having at each side of the split symmetrically arranged cam surfaces to receive distorting pressure tangentially to the race; and means to distort said distortable race, said means comprising a member carried by the distortable race but movable relative thereto, the member having symmetrically arranged cam surfaces inclined at a slight angle to the radial direction and facing the respective cam surfaces on the race, there being rolling bodies interposed between the respective pairs of facing cam surfaces to apply distorting force to the race in response to relative movement of said member.

10. A friction transmission comprising: coaxial races, one surrounding the other; rolling bodies interposed between the races and in frictional contact therewith, one of the races being distortable and having two inclined cam surfaces facing in opposite directions, and means to distort the distortable race, said means comprising a member movable with the distortable race and also movable radially thereof, the member having two inclined cam surfaces extending substantially at right angles to a tangential direction in opposed relation to the cam surfaces on the race and spaced therefrom, and rolling bodies interposed between the respective opposed cam surfaces of the member and race for applying distorting pressure to the race in response to movement of said member radially of the race.

RICHARD ERBAN.